United States Patent
Ueki et al.

(10) Patent No.: US 9,724,940 B1
(45) Date of Patent: Aug. 8, 2017

(54) RECORDING METHOD, RECORDING SYSTEM, AND RECORDING APPARATUS

(71) Applicant: FUJI XEROX CO., LTD., Tokyo (JP)

(72) Inventors: Hiroyuki Ueki, Kanagawa (JP); Mami Hatanaka, Kanagawa (JP); Toshitake Yui, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 15/235,212

(22) Filed: Aug. 12, 2016

(30) Foreign Application Priority Data

Mar. 25, 2016 (JP) .................. 2016-062373

(51) Int. Cl.
   *B41J 11/00* (2006.01)
   *C09D 11/30* (2014.01)
   *C09D 11/38* (2014.01)

(52) U.S. Cl.
   CPC ............ *B41J 11/002* (2013.01); *C09D 11/30* (2013.01); *C09D 11/38* (2013.01)

(58) Field of Classification Search
   CPC ......... B41J 11/002; C09D 11/30; C09D 11/38
   See application file for complete search history.

(56) References Cited

U.S. PATENT DOCUMENTS

| 4,752,784 A * | 6/1988 | Saito .................. B41J 2/065 347/100 |
| 2016/0355020 A1* | 12/2016 | Yamamoto .......... B41J 2/17513 |

FOREIGN PATENT DOCUMENTS

| JP | 2015-085568 | 5/2015 |
| JP | 2015-093954 | * 5/2015 ............... B41J 2/01 |

OTHER PUBLICATIONS

Abstract and machine translation of JP 2015-085568.
Abstract and machine translation of JP 2015-093954.

* cited by examiner

*Primary Examiner* — Henok Legesse
(74) *Attorney, Agent, or Firm* — Fildes & Outland, P.C.

(57) ABSTRACT

A recording method includes: ejecting aqueous ink to a surface of a recording medium by an ejection head, the aqueous ink containing a colorant, polymer particles having a glass-transition temperature Tg of 35° C. to 65° C., and a solvent containing water and an aqueous organic solvent, the aqueous ink having a viscosity ratio (V35/Vi) of a viscosity V35 that is obtained when the aqueous ink is heated at 35° C. for 30 minutes to an initial viscosity Vi of the aqueous ink being lower than 2.0 and a viscosity ratio (V65/Vi) of a viscosity V65 that is obtained when the aqueous ink is heated at 65° C. for 30 minutes to Vi being 8.0 to 20.0; and drying the aqueous ink ejected to the recording medium. The head temperature Th of the ejection head, the glass-transition temperature Tg, and the drying temperature Td satisfy an expression: Th<Tg<Td.

6 Claims, 2 Drawing Sheets

RECORDING METHOD, RECORDING SYSTEM, AND RECORDING APPARATUS

CROSS-REFERENCE TO RELATED APPLICATIONS

This application is based on and claims priority under 35 USC 119 from Japanese Patent Application No. 2016-062373 filed on Mar. 25, 2016.

BACKGROUND

Technical Field

The present invention relates to a recording method, a recording system, and a recording apparatus.

SUMMARY

According to an aspect of the invention, there is provided a recording method including: ejecting aqueous ink to a surface of a recording medium by an ejection head, the aqueous ink containing a colorant, polymer particles having a glass-transition temperature of 35° C. to 65° C., and a solvent containing water and an aqueous organic solvent, the aqueous ink having a viscosity ratio (V35/Vi) of a viscosity V35 that is obtained when the aqueous ink is heated at 35° C. for 30 minutes to an initial viscosity Vi of the aqueous ink being lower than 2.0, the aqueous ink having a viscosity ratio (V65/Vi) of a viscosity V65 that is obtained when the aqueous ink is heated at 65° C. for 30 minutes to the initial viscosity Vi of the aqueous ink being 8.0 to 20.0; and drying the aqueous ink ejected to the surface of the recording medium by the ejection head. In the recording method, a head temperature Th of the ejection head, a glass-transition temperature Tg of the polymer particles, and a drying temperature Td satisfy an expression: Th<Tg<Td.

BRIEF DESCRIPTION OF DRAWINGS

Exemplary embodiments of the present invention will be described in detail based on the following figures, wherein.

DETAILED DESCRIPTION

Figure 1:
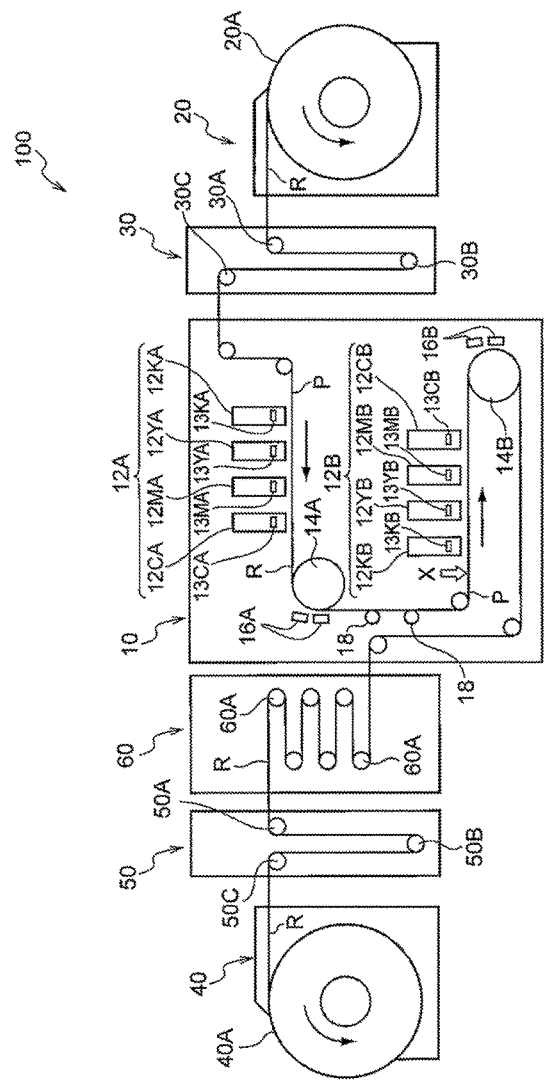
FIG. 1 is a view of a schematic configuration diagram illustrating a recording apparatus according to an exemplary embodiment.

Hereinafter, exemplary embodiments as examples of the invention will be described.

A recording apparatus according to an exemplary embodiment includes an ejection head and a drying unit. The ejection head stores aqueous ink and ejects the aqueous ink to a surface of a recording medium. The drying unit dries the aqueous ink ejected to the surface of the recording medium by the ejection head. A relationship between a head temperature Th of the ejection head, a glass-transition temperature Tg of polymer particles, and a drying temperature Td of the drying unit satisfies the following expression: Th<Tg<Td.

Meanwhile, in the recording apparatus according to the exemplary embodiment, the following recording method (recording method according to the exemplary embodiment) is achieved. That is, the recording method includes ejecting, by the ejection head, the aqueous ink to a surface of a recording medium, and drying, by the drying unit, the aqueous ink ejected to the surface of the recording medium by the ejection head. A relationship between the head temperature Th of the ejection head, the glass-transition temperature Tg of the polymer particles, and the drying temperature Td of the drying u satisfies the following expression: Th<Tg<Td.

Here, the head temperature Th of the ejection head means a temperature of an ink ejecting surface (nozzle surface) of the temperature-controlled ejection head. In other words, in the ejection head, the temperature of the ink ejecting surface (nozzle surface) is controlled to have the temperature Th.

Then, in the recording apparatus according to the exemplary embodiment, as the aqueous ink, there is applied aqueous ink which contains a colorant, polymer particles having a glass-transition temperature of 35° C. to 65° C., and a solvent containing water and an aqueous organic solvent, of which a ratio (V35/Vi) of a viscosity V35 that is obtained when the aqueous ink is heated at 35° C. for 30 minutes to an initial viscosity Vi of the aqueous ink is lower than 2.0, and of which a ratio (V65/Vi) of a viscosity V65 that is obtained when the aqueous ink is heated at 65° C. for 30 minutes to the initial viscosity Vi of the aqueous ink is 8.0 to 20.0.

In the recording apparatus according to the exemplary embodiment, a configuration described above causes a fixability of the aqueous ink to be secured, and reduces an occurrence of latency. This is supported by the following description.

In order to improve the fixability of ink to a slow-permeable or impermeable recording medium, it is known that aqueous ink containing polymer particles having a specific glass-transition temperature (Tg) is applied.

Meanwhile, in the recording apparatus in which the temperature-controlled ejection head heats and dries the aqueous ink ejected to the recording medium, in a case where the aqueous ink containing the polymer particles is applied, in terms of a reduction in the occurrence of the latency, the head temperature (controlled head temperature) of the ejection head may be lower than the glass-transition temperature of the polymer particles. In addition, in terms of improvement of the fixability, the drying temperature may be higher than the glass-transition temperature of the polymer particles. In other words, the relationship between the head temperature Th of the ejection head, the glass-transition temperature Tg of the polymer particles, and the drying temperature Td of the drying unit satisfies the following expression: Th<Tg<Td.

Specifically, it is required that the viscosity of the aqueous ink is little increased at the head temperature of the ejection head, and the viscosity of the aqueous ink is significantly increased at the drying temperature. In this respect, the aqueous ink containing the polymer particles is remarkably increased in viscosity at the drying temperature.

However, when the aqueous ink containing the polymer particles, of which the viscosity is remarkably increased at the drying temperature, is applied, the latency occurs in some cases, when the aqueous ink in the ejection head is exposed to evaporative drying, although the head temperature (controlled head temperature) of the ejection head is lower than the glass-transition temperature.

Thus, the viscosity ratio (V35/Vi) of the aqueous ink is lower than 2.0, the viscosity ratio (V65/Vi) of the aqueous ink is 8.0 to 20.0, the viscosity of the aqueous ink is little increased at the head temperature of the ejection head, and an increase of the viscosity of the aqueous ink is reduced at the drying temperature in a range in which the fixability is secured.

In this manner, when the head temperature (controlled head temperature) of the ejection head is lower than the glass-transition temperature of the polymer particles, an increase in the viscosity of the aqueous ink is reduced even when the aqueous ink in the ejection head is exposed to the evaporative drying.

As described above, in the recording apparatus according to the exemplary embodiment, it is predicted that the occurrence of the latency is reduced.

In addition, in the recording apparatus according to the exemplary embodiment, since the increase in the viscosity of the aqueous ink is reduced at the drying temperature in the range in which the fixability is secured, the fixability of the ink is secured.

Here, the latency indicates an ejection defect of a reduced amount of ink which is ejected after a period of time elapses after the aqueous ink is ejected, or landing of the ejected aqueous ink at a position shifted from a position expected to be a landing position on the recording medium.

The slow-permeable or impermeable recording medium means a recording medium into which the aqueous ink is not or little permeable (specifically, recording medium having the maximum liquid absorption amount of ink of 15 ml/m$^2$ or less within contact time of 500 ms measured by a dynamic scanning absorptometer).

In the recording apparatus according to the exemplary embodiment, in a case of including plural ejection heads, the specific aqueous ink described above may be applied as aqueous ink in the ejection head that, at least first, ejects the aqueous ink, and thus the expression: Th<Tg<Td may be satisfied. This is because the first ejection of the aqueous ink allows a moisture content of the recording medium to be increased, and allows the evaporative drying of the aqueous ink in nozzles of the next ejection heads of the ejection head that first ejects the aqueous ink to be slow.

In addition, in a case where recording is performed on both surfaces of the recording medium, the aqueous ink is ejected to a front surface (right-side surface) of the recording medium, then, the aqueous ink is heated and dried, and then, aqueous ink is again ejected to a rear surface of the recording medium. In this case, the aqueous ink ejected on the front surface (right-side surface) of the recording medium is dried, and thereby the recording medium is in a dried state having a particularly low moisture content. Therefore, the aqueous ink is subjected to remarkable evaporative drying in nozzles of an ejection head that ejects the aqueous ink to the rear surface of the recording medium, and thus the latency is likely to occur. However, the specific aqueous ink described above is applied to the aqueous ink in the ejection head that ejects the aqueous ink to the rear surface of the recording medium, the expression: Th<Tg<Td is satisfied, and thereby, when recording is performed on both surfaces of the recording medium, drying of the aqueous ink ejected to the front surface (right-side surface) of the recording medium reduces the latency occurring when the aqueous ink is ejected to the rear surface of the recording medium which is excessively dried.

Note that, also in a case of including plural ejection heads that eject the aqueous ink to the rear surface of the recording medium, the specific aqueous ink described above may be applied to aqueous ink in an ejection head that, at least first, ejects the aqueous ink to the rear surface of the recording medium, and the expression: Th<Tg<Td may be satisfied. This is because, as described above, the first ejection of the aqueous ink allows a moisture content of the recording medium to be increased, and allows the evaporative drying of the aqueous ink in nozzles of the next ejection heads of the ejection head that first ejects the aqueous ink to the rear surface of the recording medium to be slow.

Aqueous Ink

Hereinafter, the aqueous ink (hereinafter, also referred to as "aqueous ink according to the exemplary embodiment") will be described in detail.

The aqueous ink according to the exemplary embodiment contains a colorant, polymer particles, and a solvent containing water and an aqueous organic solvent.

Regarding ink according to the exemplary embodiment, a viscosity ratio (V35/Vi) of a viscosity V35 of the aqueous ink that is obtained when the aqueous ink is heated at 35° C. for 30 minutes to an initial a viscosity Vi of the aqueous ink is lower than 2.0, and a viscosity ratio (V65/Vi) of a viscosity V65 of the aqueous ink that is obtained when the aqueous ink is heated at 65° C. for 30 minutes to the initial viscosity Vi of the aqueous ink is 8.0 to 20.0.

Regarding a reduction in the occurrence of the latency, the viscosity ratio (V35/Vi) is preferably 1.0 or higher and lower than 2.0, and more preferably 1.0 to 1.8.

By comparison, in terms of securing the fixability and the reduction in the occurrence of the latency, the viscosity ratio (V65/Vi) is preferably 9.4 to 18.2, and more preferably 9.4 to 9.6.

A viscosity ratio (V65/V35) of the viscosity V65 of the aqueous ink obtained that is when the aqueous ink is heated at 65° C. for 30 minutes to the a viscosity V35 of the aqueous ink obtained that is when the aqueous ink is heated at 35° C. for 30 minutes is preferably 5.2 to 10.4, and more preferably 5.2 to 5.7. When the viscosity ratio (V65/V35) is 10.4 or lower, a difference between an increase in viscosity of the aqueous ink at the head temperature of the ejection head and an increase in viscosity of the aqueous ink at the drying temperature is prevented from being excessively increased, and it is easy to reduce the occurrence of the latency. When the viscosity ratio (V65/V35) is 5.2 or higher, it is easy to secure the fixability of the ink.

Regarding a reduction in the occurrence of the latency, the initial viscosity Vi of the aqueous ink is preferably 5.0 mPa·s to 7.0 mPa·s, and more preferably 5.5 mPa·s to 6.9 mPa·s.

Regarding a reduction in the occurrence of the latency, the viscosity V35 of the aqueous ink is preferably 8.0 mPa·s to 13.0 mPa·s, and more preferably 9.0 mPa·s to 12.0 mPa·s.

Regarding the securing of the fixability and the reduction in the occurrence of the latency, the viscosity V65 of the aqueous ink is preferably 45 mPa·s to 120 mPa·s, and more preferably 50 mPa·s to 115 mPa·s.

Here, the initial viscosity Vi of the aqueous ink means a viscosity that is measured under conditions of a temperature of 23° C. without heating the aqueous ink.

By comparison, a viscosity VX of the aqueous ink that is obtained when the aqueous ink is heated at X° C. for 30 minutes means a viscosity that is measured under conditions of a temperature of the aqueous ink after 5 g of the aqueous ink is poured into a glass container having a diameter of 7 cm, and then the glass container remains for 30 minutes on a hot plate of which a temperature is set to X° C.

Note that the various types of viscosities of the aqueous ink are measured using TV-20 (manufactured by Toki Sangyo Co., Ltd.) as a measurement apparatus, and under a condition of a shear rate of 1400 S$^{-1}$.

Examples of a method of adjusting the viscosity ratio (V35/Vi) and the viscosity ratio (V65/Vi) of the aqueous ink in a range described above include, for example, 1) a method of using a moisturizing solvent such as glycerin, 2) a method of adjusting an additive amount of a solid component such as polymer particles, 3) a method of adjusting a molecular weight of a polymer, and the like.

Colorant

Next, the colorant will be described.

As the colorant, a colorant corresponding to aqueous ink having a target hue may be used, specifically, a pigment may be used. Examples of the pigment include an organic pigment and an inorganic pigment.

Specific examples of a black pigment include Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080, Raven 1060 (all produced by Columbian Carbon Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (all produced by Cabot Corporation), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (all produced by Orion Engineered Carbons), No. 25, No. 33, No. 40, No. 47, No. 52, No. 900, No. 2300, MCF-88, MA600, MA7, MAS, MA100 (all produced by Mitsubishi Chemical Corporation), and the like; however, the examples are not limited thereto.

Specific examples of a cyan pigment include C.I.Pigment Blue-1, -2, -3, -15, -15:1, -15:2, -15:3, -15:4, -16, -22, -60, and the like; however, the examples are not limited thereto.

Specific examples of a magenta pigment include C.I.Pigment Red-5, -7, -12, -48, -48:1, -57, -112, -122, -123, -146, -168, -177, -184, -202, C.I.Pigment Violet-19, and the like; however, the examples are not limited thereto.

Specific examples of a yellow pigment include C.I.Pigment Yellow-1, -2, -3, -12, -13, -14, -16, -17, -73, -74, -75, -83, -93, -95, -97, -98, -114, -128, -129, -138, -151, -154, -180, and the like; however, the examples are not limited thereto.

Here, in a case where a pigment is used as the colorant, it is preferable that a pigment dispersant is used together with the pigment. Examples of the pigment dispersant include a polymer dispersant, an anionic surfactant, a cationic surfactant, an amphoteric surfactant, a nonionic surfactant, and the like.

It is preferable that, as the polymer dispersant, a polymer having a hydrophilic structure and a hydrophobic structure is used. For example, a condensation polymer and an addition polymer are used as the polymer having the hydrophilic structure and the hydrophobic structure. An example of the condensation polymer includes a well-known polyester dispersant. An example of the addition polymer includes a monomeric addition polymer having an $\alpha,\beta$-ethylenically unsaturated group. A monomer having a $\alpha,\beta$-ethylenically unsaturated group with a hydrophilic group and a monomer having a $\alpha,\beta$-ethylenically unsaturated group with a hydrophobic group are combined to be copolymerized, and thereby obtaining the target polymer dispersant. In addition, a homopolymer of a monomer having $\alpha,\beta$-ethylenically unsaturated group with the hydrophilic group is also used.

Examples of the monomer having the $\alpha,\beta$-ethylenically unsaturated group with the hydrophilic group include a monomer having a carboxyl group, a sulfonate group, a hydroxyl group, a phosphate group, or the like, for example, acrylic acid, methacrylic acid, crotonic acid itaconic acid, itaconic acid monoester, maleic acid, maleic acid monoester, fumaric acid, fumaric acid monoester, vinyl sulfonic acid, styrenesulfonic acid, sulfonated vinylnaphthalene, vinyl alcohol, acrylamide, methacryloxy ethyl phosphate, bis-methacryloxy ethyl phosphate, methacryloxyethyl phenyl acid phosphate, ethylene glycol dimethacrylate, diethylene glycol dimethacrylate, and the like.

Examples of the monomer having the $\alpha,\beta$-ethylenically unsaturated group with the hydrophobic group include a styrene derivative such as styrene, $\alpha$-methyl styrene, vinyl toluene, vinylcyclohexane, vinylnaphthalene, a vinylnaphthalene derivative, acrylic acid alkyl ester, methacrylic acid alkyl ester, methacrylic acid phenyl ester, methacrylic acid cycloalkyl ester, crotonic acid alkyl ester, itaconic acid dialkyl ester, maleic acid dialkyl ester, and the like.

Examples of a copolymer, which is preferably used as the polymer dispersant, include a styrene-styrene sulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, an acrylic acid alkyl ester-acrylic acid copolymer, a methacrylic acid alkyl ester-methacrylic acid copolymer, a styrene-methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, or salts thereof, and the like. In addition, a monomer having a polyoxyethylene group and a hydroxyl group may be copolymerized with the above copolymers.

A weight-average molecular weight of the polymer dispersant may be, for example, 2,000 to 50,000.

The polymer dispersants may be individually used or may be used by combining two types or more thereof. A polymer dispersant content significantly varies depending on the pigment and thus the polymer dispersant content is not categorically described; however, the content may be 0.1% by weight to 100% by weight with respect to the pigment.

An example of the pigment includes a pigment which is self-dispersed in water (hereinafter, referred to as a self-dispersed pigment).

The self-dispersed pigment indicates a pigment which has a solubilizing group in water on a surface thereof and which is dispersed in water even though there is no polymer dispersant. The self-dispersant pigment is obtained by performing a surface modification treatment such as an acid-base treatment, a coupling agent treatment, a polymer grafting treatment, a plasma treatment, an oxidation/reduction treatment.

Examples of the self-dispersant pigment include, in addition to a pigment obtained by performing the surface modification treatment to the pigment described, commercially available self-dispersant pigments such as Cab-o-jet-200, Cab-o-jet-300, Cab-o-jet-400, JX-157, IJX-253, IJX-266, IJX-273, IJX-444, IJX-55, Cab-o-jet-250C, Cab-o-jet-260M, Cab-o-jet-270Y, Cab-o-jet-450C, Cab-o-jet-465M, Cab-o-jet-470Y, and Cab-o-jet-480M produced by Cabot Corporation, and Microjet Black CW-1 and CW-2 produced by Orient Chemical Co., Ltd.

It is preferable that a pigment having, on the surface thereof, at least sulfonic acid, a sulfonate, carboxylic acid, or a carboxylate, as a functional group, is used as the self-dispersant pigment. It is more preferable that a pigment having, on the surface thereof, at least carboxylic acid or a carboxylate as a functional group is used.

Here, an example of a pigment also includes a pigment coated with a resin, or the like. This pigment is referred to as a microcapsule pigment, and there is a commercially available microcapsule pigment produced by DIC Corporation, Toyo Ink Mfg. Co., Ltd., or the like. Note that the pigment is not limited to the commercially available microcapsule pigment and a microcapsule pigment prepared depending on the purpose may be used.

In addition, an example of the pigment also includes a resin dispersion type pigment obtained by physical adsorption or chemical bonding of a polymer compound to a pigment.

In addition, examples of the pigment also include a pigment with a specific color such as red, green, blue, brown, or white, other than pigments with black, and three primary colors of cyan, magenta, and yellow, a pigment with metallic luster such as gold or silver color, a colorless or light-colored extender pigment, a plastic pigment, and the like.

In addition, examples of the pigment also include particles obtained by fixing dye or a pigment to a surface of silica, alumina, a polymer bead, or the like, as a core, an insoluble laking substance of dye, colored emulsion, colored latex, and the like.

Examples of the colorant include, in addition to the pigment, a type of dye such as hydrophilic anionic dye, direct dye, cationic dye, reactive dye, macromolecular dye, or oil-soluble dye, wax powder colored with dye, resin powder, emulsion, fluorescent dye, a fluorescent pigment, and the like.

A volume average particle diameter of the colorant is, for example, 10 nm to 1,000 nm.

The volume average particle diameter of the colorant means a particle size of the colorant as is, or a particle size with an additive substance attached in a case where the additive substance such as a dispersant is attached to the colorant.

Measurement of the volume average particle diameter is performed by Microtrac UPA particle size analyzer UPA-UTI51 (manufactured by Microtrac). The measurement is performed by putting 1,000-fold diluted aqueous ink into a measurement cell. Note that, as input values at the time of the measurement, viscosity of an aqueous-ink-diluted solution is employed as the viscosity, and a refractive index of the colorant is employed as a particle refractive index.

A colorant content (concentration) is, for example, preferably 1% by weight to 25% by weight, and more preferably 2% by weight to 20% by weight with respect to the aqueous ink.

Polymer Particles

The polymer particles are described.

The polymer particles are components that improve the fixability of an image form of the aqueous ink to the recording medium.

Note that the polymer particles are formed by granulation of a polymer compound, and thus are components different from the polymer dispersant described above.

Polymer particles having the glass-transition temperature Tg of 35° C. to 65° C. is applied as the polymer particles. When the glass-transition temperature Tg of the polymer particles is within the range described above, the occurrence of the latency is reduced and it is easy to improve the fixability of the aqueous ink (that is, improve abrasion resistance of an image).

The glass-transition temperature of the polymer particles is determined from a DSC curve obtained by differential scanning calorimetry (DSC), and, more specifically, is determined by an "extrapolated starting temperature of glass transition" disclosed in a method of obtaining the glass-transition temperature of a "transition temperature measuring method of plastics" in JIS K7121-1987.

Examples of the polymer particles include particles (latex particles) such as styrene-acrylic acid copolymer, a styrene-acrylic acid-sodium acrylic acid copolymer, a styrene-butadiene copolymer, polystyrene, an acrylonitrile-butadiene copolymer, an acrylate ester copolymer, polyurethane, polyester, a silicone-acrylic acid copolymer, or an acrylic-modified fluorine resin.

Note that an example of the polymer particles also includes a core and shell type polymer particles having a composition in the central portion different from the outer edge portion of the particles.

The polymer particles may be dispersed in the aqueous ink using an emulsifier or may be dispersed in the aqueous ink without using the emulsifier.

Examples of the emulsifier include a surfactant, or a polymer having a hydrophilic group such as a sulfonate group or a carboxyl group (for example, a polymer to which the hydrophilic group is grafted, or a polymer obtained from a monomer having a hydrophilic portion and a monomer having a hydrophobic portion).

In terms of glossiness and abrasion resistance of the image, the volume average particle diameter of the polymer particles is preferably 10 nm to 300 nm, and more preferably 10 nm to 200 nm.

Measurement of the volume average particle diameter of the polymer particles is performed by Microtrac UPA particle size analyzer UPA-UT151 (manufactured by Microtrac). The measurement is performed by putting 1,000-fold diluted aqueous ink into a measurement cell. Note that, as input values at the time of the measurement, a viscosity of an aqueous-ink-diluted solution is employed as the viscosity, and a refractive index of the polymer particles is employed as a particle refractive index.

In terms of the fixability of an image and in terms of ejection stability and a film forming property, a polymer particle content is preferably 0.1% by weight to 10% by weight, and more preferably 0.5% by weight to 5% by weight with respect to the aqueous ink.

Water

Water is described.

Regarding, particularly, prevention of impurities from being mixed or a microorganism from occurring, examples of water include preferably ion-exchanged water, ultrapure water, distilled water, or ultrafiltration water.

A water content is, for example, preferably 10% by weight to 95% by weight, and more preferably 30% by weight to 90% by weight with respect to the aqueous ink.

Aqueous Organic Solvent

The aqueous organic solvent is described.

Examples of the aqueous organic solvent include polyhydric alcohol, a polyhydric alcohol derivative, a nitrogen-containing solvent, alcohol, a sulfur-containing solvent, and the like. Examples of the aqueous organic solvent also include, other than those listed above, propylene carbonate, ethylene carbonate, and the like.

Examples of the polyhydric alcohol include ethylene carbonate, ethylene glycol, diethylene glycol, propylene glycol, butylene glycol, triethylene glycol, 1,5-pentanediol, 1,2-hexanediol, 1,2,6-hexanediol, glycerin, and the like.

Examples of the polyhydric alcohol derivative include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monomethyl ether, ethylene oxide adduct of diglycerin, and the like.

Examples of the nitrogen-containing solvent include pyrrolidone, N-methyl-2-pyrrolidone, cyclohexyl pyrrolidone, triethanolamine, and the like.

Examples of the alcohol include ethanol, isopropyl alcohol, butyl alcohol, benzyl alcohol, and the like.

Examples of the sulfur-containing solvent include thiodiethanol, thiodiglycerol sulfolane, dimethylsulfoxide, and the like.

One type of the aqueous organic solvent may be used, or two or more types thereof may be used.

An aqueous organic solvent content is preferably 1% by weight to 60% by weight, and more preferably 1% by weight to 40% by weight with respect to water.

Surfactant

The surfactant is described.

It is preferable that the aqueous ink contains, as the surfactant, a surfactant having a hydrophilic/hydrophobic balance, that is, a "hydrophile-lipophile balance" (H-LB) of 14 or lower. An amount of the surfactant having the HLB of 14 or lower is adjusted, plural types of surfactants having different HLB are used, and thereby it is easy to adjust surface tension of the aqueous ink.

Note that the hydrophilic/hydrophobic balance, that is, the "hydrophile-lipophile balance" (HLB) is defined by the following expression (Griffin method).

HLB=20×(sum of formula weight of hydrophilic portions/molecular weight)

Examples of the surfactant include at least one type selected from a group consisting of ethylene oxide adducts of acetylene glycol and polyether-modified silicones.

The ethylene oxide adduct of acetylene glycol is a compound having, for example, an —O—(CH$_2$CH$_2$O)$_n$—H structure (note that, for example, n represents an integer of 1 to 30) obtained by adding an ethylene oxide to at least one hydroxyl group of acetylene glycol.

Examples of commercialized products of the ethylene oxide adduct of acetylene glycol (note that values in parentheses indicate catalog values of the HLB) include Olfin E1004 (7 to 9), Olfin E1010 (13 to 14), Olfin EXP.4001 (8 to 11), Olfin EXP.4123 (11 to 14), Olfin EXP.4300 (10 to 13), Surfynol 104H (4), Surfynol 420 (4), Surfynol 440 (4), Dynol 604 (8), (all manufactured by Nissin Chemical Industry Co., Ltd.), and the like.

The polyether-modified silicone is, for example, a compound obtained by bonding a polyester group to a silicone chain (polysiloxane main chain) so as to have a graft shape or by bonding so as to have a block shape. Examples of the polyether group include, for example, a polyoxyethylene group or a polyoxypropylene group. The polyether group may be, for example, a polyoxyalkylene group obtained by adding an oxyethylene group and an oxypropylene group in a block shape or in a random manner.

Examples of commercialized products of the polyether-modified silicone (note that values in parentheses indicate catalog values of the HLB) include Silface SAG002 (12), Silface SAG503A (11), Silface SAG005 (7), (all manufactured by Nissin Chemical Industry Co., Ltd.), and the like.

Another surfactant different from the ethylene oxide adducts of acetylene glycol and the polyether-modified silicones may be used in the aqueous ink.

Examples of the other surfactant include an anionic surfactant, a nonionic surfactant, a cationic surfactant, an amphoteric surfactant, and the like, and preferable examples thereof are the anionic surfactant and the nonionic surfactant.

Examples of the anionic surfactant include an alkyl benzene sulfonate, an alkyl phenyl sulfonate, an alkyl naphthalene sulfonate, a higher fatty acid salt, a sulfuric acid ester salt of higher fatty acid ester, a sulfonate of higher fatty acid ester, a sulfuric acid ester salt and a sulfonate of higher alcohol ether, a higher alkyl sulfosuccinate, a polyoxyethylene alkyl ether carboxylate, a polyoxyethylene alkyl ether sulfate, an alkyl phosphate, a polyoxyethylene alkyl ether phosphate, and the like.

Among those listed above, a dodecylbenzene sulfonate, an isopropyl naphthalene sulfonate, a monobutyl phenyl phenol monosulfonate, a monobutyl biphenyl sulfonate, a dibutyl phenyl phenol disulfonate, or the like may be used as the anionic surfactant.

Examples of the nonionic surfactant include polyoxyethylene alkyl ether, polyoxyethylene alkylpnenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglyceryl fatty acid ester, sucrose fatty acid ester, polyoxyethylene alkylamine, polyoxyethylene fatty acid amide, alkyl alkanolamide, a polyethylene glycol polypropylene glycol block copolymer, acetylene glycol, and the like.

Among those listed above, polyoxyethylene nonylphenyl ether, polyoxyethylene octyl phenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylolamide, a polyethylene glycol polypropylene glycol block copolymer, acetylene glycol, and the like may be used as the nonionic surfactant.

Examples of the nonionic surfactant include, other than those listed above, a silicone surfactant of a polysiloxane oxyethylene adduct or the like; a fluorochemical surfactant such as a perfluoroalkyl carboxylate, a perfluoroalkyl sulfonate, oxyethylene perfluoroalkyl ether, a bio-surfactant such as spiculisporic acid, rhamnolipid, lysolecithin; and the like.

In terms of solubility or the like, the hydrophilic/hydrophobic balance (HLB) of the other surfactant may be, for example, in a range of 3 to 20.

One type of surfactant may be used or two or more types of surfactants may be used together.

A surfactant content is, in total, preferably 0.1% by weight to 10% by weight, more preferably 0.1% by weight to 5% by weight, and still more preferably 0.2% by weight to 3% by weight.

Other Additives

Other additives are described.

The aqueous ink may contain other additives.

Examples of the other additives include an ink ejection improving agent (polyethylenimine, polyamines, polyvinylpyrrolidone, polyethylene glycol, ethyl cellulose, carboxymethylcellulose, or the like), a conductivity/pH adjuster (compound of alkali metals such as potassium hydroxide, sodium hydroxide, or lithium hydroxide, or the like), a reactive dilution solvent, a penetrant, a pH buffering agent, an antioxidant, a mildew-proofing agent, a viscosity modifier, a conductive agent, a chelator, an ultraviolet absorber, an infrared absorbing agent, and the like.

Physical Properties of Aqueous Ink

A preferable physical property of the aqueous ink is described.

The aqueous ink has pH, preferably in a range of 4 to 10, and more preferably in a range of 5 to 9.

Here, as the pH of the aqueous ink, a value obtained by measurement by a pH/conductivity meter (MPC227 manufactured by Mettler Toledo International Inc.) in an environment in which the temperature is 23±0.5° C. and the humidity is 55±5% R.H.

The conductivity of the aqueous ink is, for example, in a range of 0.01 S/m to 0.5 S/m (preferably, in a range of 0.01 S/m to 0.25 S/m, and more preferably, in a range of 0.01 S/m to 0.20 S/m).

Measurement of the conductivity is performed by MPC 227 (pH/conductivity Meter, manufactured by Mettler Toledo International Inc).

Use

Here, the aqueous ink according to the exemplary embodiment may be any one of black ink, cyan ink, magenta ink, yellow ink, and neutral color ink having a color except the ink listed above.

In addition, the aqueous ink according to the exemplary embodiment may be used as an ink set which contains at least one of the types of aqueous ink (preferably, all formed of the aqueous ink according to the exemplary embodiment).

Recording Apparatus/Recording Method

Hereinafter, an example of the recording apparatus and the recording method according to the exemplary embodiment will be described. Note that, in the following description, ejection of aqueous ink to a recording medium (target region) is referred to as "image formation, or "an image is formed", and the aqueous ink is ejected to the recording medium, performing of drying and fixing is referred to as "recording", "image recording", or "an image is recorded".

FIG. 1 is a view of a schematic configuration diagram illustrating the recording apparatus according to the exemplary embodiment.

A recording apparatus 100 according to the exemplary embodiment includes an image recording unit 10 that records an image on a recording medium P, a pre-processing unit 20 in which the recording medium P that is supplied to the image recording unit 10 is accommodated, and a buffer unit 30 that adjusts an amount of transport or the like of the recording medium P which is supplied to the image recording unit 10 from the pre-processing unit 20. The buffer unit 30 is disposed between the image recording unit 10 and the pre-processing unit 20.

In addition, the recording apparatus 100 includes a post-processing unit 40 that accommodates the recording medium P which is discharged from the image recording unit 10, and a buffer unit 50 that adjusts an amount of transport or the like of the recording medium P which is discharged from the image recording unit 10 to the post-processing unit 40. The buffer unit 50 is disposed between the image recording unit 10 and the post-processing unit 40.

Further, the recording apparatus 100 includes a cooling unit 60 that is disposed between the image recording unit 10 and the buffer unit 50, and that cools the recording medium P that is transported from the image recording unit 10.

For example, the image recording unit 10 includes a roller member (without a reference sign assigned) that guides the recording medium P along a transporting path R of the recording medium P, and an ejection head (first ejection head) 12A that ejects the aqueous ink (droplet of aqueous ink) to a front surface of the recording medium P that is transported along the transporting path of the recording medium P, and an ejection head (second ejection head) 12B that ejects the aqueous ink (droplet of aqueous ink) to a rear surface of the recording medium P that is transported along the transporting path of the recording medium P.

The ejection head 12A performs primary image forming on the front surface of the recording medium P, and the ejection head 12B performs secondary image forming on the rear surface of the recording medium P after the primary image forming.

The ejection heads 12A and 12B are, for example, an elongated ejection head having a valid recording region (arrangement region of nozzles that eject the aqueous ink) equal to or greater than a width (length in a direction intersecting with (for example, orthogonal to) a transporting direction of the recording medium P) of the recording medium P.

Note that the ejection heads 12A and 12B are not limited thereto, and may be an ejection head that is shorter than the width of the recording medium P, and may be a type (so-called carriage type) of ejection head that moves in a width direction of the recording medium P and ejects the aqueous ink.

A well-known type of ejection head is applied to the ejection heads 12A and 12B, and the ejection heads may be a so-called thermal type ejection head that ejects a droplet of the aqueous ink by heat or may be a so-called piezoelectric type that ejects a droplet of the aqueous ink by pressure.

The ejection heads 12A and 12B have ejection heads 12KA and 12KB that eject the aqueous ink to the recording medium P and form an image having a color of K (black), ejection heads 12YA and 12YB that eject the aqueous ink and form an image having a color of Y (yellow), ejection heads 12MA and 12MB that eject the aqueous ink and form an image having a color of M (magenta), and ejection heads 12CA and 12CB that eject the aqueous ink and form an image having a color of C (cyan), respectively. The ejection heads 12KA and 12KB, the ejection heads 12YA and 12YB, the ejection heads 12MA and 12MB, and the ejection heads 12CA and 12CB are arranged to face the recording medium P, in this order, from the upstream side to the downstream side in the transporting direction of the recording medium P (hereinafter, simply referred to as a "sheet transporting direction" in some cases). Note that, in a case where K, Y, M, and C are not distinguished, K, Y, M, and C attached to the reference numbers are omitted in the description of the ejection heads.

The ejection heads 12KA, 12YA, 12MA, 12CA, 12KB, 12YB, 12MB, and 12CB are connected, through a supply tube (not shown), to respective color ink cartridges (not shown) which are attached to and detached from the recording apparatus 100, and ink having respective colors is supplied to the ejection heads 12KA, 12YA, 12MA, 12CA, 12KB, 12YB, 12MB, and 12CB, respectively, from the ink cartridges.

The ejection heads 12A and 12B are not limited to a system in which the four ejection heads are arranged to correspond to the above four colors, and a system may be employed, in which four or more ejection heads are arranged corresponding to four or more colors by adding other intermediate colors depending on a purpose.

Here, as the ejection heads 12A and 12B, for example, either an ejection head (for example, ejection head with 600 dpi) for low resolution that ejects the aqueous ink in a range of an amount of an ink droplet of 1 pl to 15 pl, or an ejection head (for example, ejection head with 1200 dpi) for high resolution that ejects the aqueous ink in a range of an amount of an ink droplet of smaller than 10 pl may be used. In addition, the ejection heads 12A and 12B may be provided with both the ejection heads for low resolution and the ejection heads for high resolution.

The amount of the ink droplet from the ejection heads 12A and 12B is in a range of the maximum amount of the droplet of the aqueous ink. In addition, dpi means a "dot per inch".

Here, built-in heaters (an example of a temperature control device) 13A (13KA, 13YA, 13MA, and 13CA) and 13B (13KB, 13YB, 13 MB, and 13CB), which controls a temperature (temperature of an ejection surface) of a head, are arranged in the ejection heads 12A (12KA, 12YA, 12MA, and 12CA) and 12B (12KB, 12YB, 12MB, and 12CB), respectively. The temperature of the head (temperature of the ejection surface) of each of the ejection heads 12A and 12B is controlled to a target temperature by the heaters 13A and 13B, and the ejection heads 12A and 12B eject the aqueous ink.

Note that the temperature control device, which controls the temperature of the heads 12A and 12B (temperature of the ejection surface) is not limited to the heater, and a known temperature control device such as a device that blows hot air may be used. In addition, the temperature control device is not limited to the built-in mode in the ejection head, and may be provided on the outside of the ejection head.

In the image recording unit 10, a drying drum 14A (an example of a drying unit) is disposed on the downstream side of the ejection heads 12A in the sheet transporting direction. For example, the rear surface of the recording medium P is wound on the drying drum 14A. The drying drum 14A dries an image (ink) on the front surface of the recording medium with contacting with the recording medium P anding being driven to rotate.

Similarly, in the image recording unit 10, a drying drum 14B (an example of the drying unit) is disposed on the downstream side of the ejection heads 12B in the sheet transporting direction. For example, the front surface of the recording medium P is wound on the drying drum. The drying drum 14B dries an image (ink) on the rear surface of the recording medium with contacting with the recording medium P and being driven to rotate.

A transporting roller 18 that contacts with the front surface of the recording medium P is disposed on the downstream side of the drying drum 14A in the sheet transporting direction, that is, on the upstream side of the ejection head 12B in the sheet transporting direction.

Built-in heating sources (for example, halogen heater or the like: not shown) are disposed inside the drying drums 14A and 14B, respectively. The drying drum 14A heats, by the heating source, and dries the image (ink) on the front surface of the recording medium P, and the drying drum 14B heats, by the heating source, and dries the image (ink) on the rear surface of the recording medium P.

A hot air blowing devices 16A and 16B (an example of the drying unit), which dries the image (ink) on the recording medium P, are disposed around the drying drums 14A and 14B, respectively. The image (ink) on the front surface of the recording medium P wound on the drying drum 14A is dried by hot air from the hot air blowing device 16A, and the image (ink) on the rear surface of the recording medium P wound on the drying drum 14B is dried by hot air from the hot air blowing device 16B.

In a case of using the drying unit performing such heating and drying described above, it is preferable that the drying conditions are as follows.

In other words, in terms of rapid drying of the aqueous ink and a reduction in deformation of the recording medium P, a temperature of the heating source of the drying drum and a temperature of the hot air from the hot air blowing device are set preferably in a range of 40° C. to 120° C., and more preferably in a range of 60° C. to 100° C.

Note that the drying drum 14A and the drying drum 14B, and the hot air blowing device 16A and the hot air blowing device 16B may have the same or different conditions of the drying temperature.

Here, the drying units in the image recording unit 10 have the same configuration for drying the front surface of the recording medium P (drying drum 14A and hot air blowing device 16A), and for drying the rear surface of the recording medium P (drying drum 14B and hot air blowing device 16B), the devices are not limited to the configuration, and may have different configurations from each other.

Note that, in the image recording unit 10, other drying units such as a near-infrared heater (not shown) or a laser irradiation device, which dry the image (ink) on an underlayer of the recording medium P, may be disposed on the downstream side of the ejection heads 12A and 12B in the sheet transporting direction. The other drying units such as the near-infrared heater or the laser irradiation device may be disposed instead of at least one of the drying drums 14A and 14B and the hot air blowing devices 16A and 16B, or may be disposed in addition to the drying drums 14A and 14B and the hot air blowing devices 16A and 16B.

The pre-processing unit 20 includes a supply roll 20A on which the recording medium P that is supplied to the image recording unit 10 is wound, and the supply roll 20A is rotatably supported by a frame member (not shown).

The buffer unit 30 includes a first pass roller 30A, a dancer roller 30B, and a second pass roller 30C which are arranged in the sheet transporting direction. The dancer roller 308B vertically moves in FIG. 1, thereby adjusting tension of the recording medium P which is transported to the image recording unit 10, and adjusting an amount of transporting of the recording medium P.

The post-processing unit 40 includes a winding roll 40A as an example of a transport unit that winds the recording medium P on which the image is recorded. The winding roll 40A receives rotational force from a motor (not shown) so as to rotate, and thereby the recording medium P is transported along the transporting path R.

The buffer unit 50 includes a first pass roller 50A, a dancer roller 50B, and a second pass roller 50C which are arranged in the sheet transporting direction. The dancer roller 50B vertically moves in FIG. 1, thereby adjusting tension of the recording medium P which is discharged to the post-processing unit 40, and adjusting an amount of transporting of the recording medium P.

Plural cooling rollers 60A are arranged in the cooling unit 60. The recording medium P is transported between the plural cooling rollers 60A, and thereby the recording medium P is cooled.

Here, there is no particular limitation to a recording speed, that is, a transporting speed of the recording medium, in the recording apparatus 100; however, a high speed of 10 m/min or higher may be applied because the drying unit, which dries the aqueous ink discharged to the recording medium, is provided.

Next, an operation (recording method) by the recording apparatus 100 will be described.

In the recording apparatus 100 according to the exemplary embodiment, first, the recording medium P is transported from the supply roll 20A of the pre-processing unit 20 through the buffer unit 30 to the image recording unit 10.

Next, in the image recording unit 10, the aqueous ink is ejected to the front surface of the recording medium P from the ejection heads 12A. Then, the drying drum 14A dries the image (ink) on the front surface of the recording medium P from the rear surface side of the recording medium P (a surface opposite to an ink ejection surface from the ejection head 12A). Also, the hot air blowing device 16A dries the ink (image) ejected to the front surface of the recording medium P from the front surface side of the recording medium P (ink ejection surface side from the ejection head 12A). In other words, the drying drum 14A and the hot air blowing device 16A dry the aqueous ink ejected to the surface of the recording medium P.

The image recorded on the front surface of the recording medium P contacts with the transport roller 18, and thereby the recording medium P is neutralized via the medium.

Subsequently, in the image recording unit 10, the aqueous ink is ejected from the ejection heads 12B to the rear surface of the recording medium P. Then, the drying drum 14B dries the image (ink) on the rear surface of the recording medium P from the front surface side (surface opposite to the ink ejection surface from the ejection head 12B) of the recording medium P. The hot air blowing device 16B dries the ink (image) ejected to the rear surface of the recording medium P from the rear surface side (ink ejection surface side from the ejection head 12B) of the recording medium P. In other words, the drying drum 14B and the hot air blowing device 16B dry the aqueous ink ejected to the rear surface of the recording medium P.

Next, in the cooling unit 60, the cooling rollers 60A cool the recording medium P, on the front surface of which the image is recorded.

Then, in the post-processing unit 40, the winding roll 40A winds the recording medium P, on the front surface of which the image is recorded, through the buffer unit 50.

Through the processes described above, the image is recorded on both surfaces of the recording medium P with the aqueous ink.

Note that the recording medium P having the image recorded as described above is cut to have a target size via a cutting process.

In the recording apparatus 100, the configuration of including both the ejection head 12A that ejects the aqueous ink to the front surface of the recording medium P and the ejection head 12B that ejects the aqueous ink to the rear surface of the recording medium P, the configuration is not limited thereto. For example, the recording apparatus 100 may have a configuration in which the ejection head 12B is not provided, the ejection head 12A ejects the aqueous ink to a front surface of a sheet of paper as the recording medium P, then, the recording medium P is reversed by a reversing mechanism, and then, again, the ejection head 12A ejects the aqueous ink to the rear surface of the recording medium P.

In the recording apparatus 100, a method, in which the ejection heads 12A and 12B directly eject a droplet of the aqueous ink to the surface of the recording medium P, is described; however, a method, in which the droplet of the aqueous ink is ejected to an intermediate transfer body, and then the droplet of the aqueous ink on the intermediate transfer member is transferred to the recording medium P, may be employed.

In addition, the recording apparatus 100 has a configuration in which the ejection head 12A and the recording devices (the drying drum 14A and the hot air blowing device 16A) for the front surface of the recording medium P, and the ejection head 12B and the recording devices (the drying drum 14B and the hot air blowing device 16B) for the rear surface of the recording medium P are all arranged in the same image recording unit 10; however, the recording apparatus is not limited to this configuration. For example, the recording apparatus 100 may a configuration in which two image recording units are provided, the ejection head 12A and the recording devices (the drying drum 14A and the hot air blowing device 16A) for the front surface of the recording medium P are provided in the one image recording unit, and the ejection head 12B and the recording devices (the drying drum 14B and the hot air blowing device 16B) for the rear surface of the recording medium P are provided in the other unit.

In addition, in the recording apparatus 100, a method of ejecting the aqueous ink to a roll-shaped recording medium P (so-called continuous paper) and recording the image through drying is described; however, a method of ejecting the aqueous ink to a sheet having a target size and recording the image through the drying may be employed.

Figure 2:
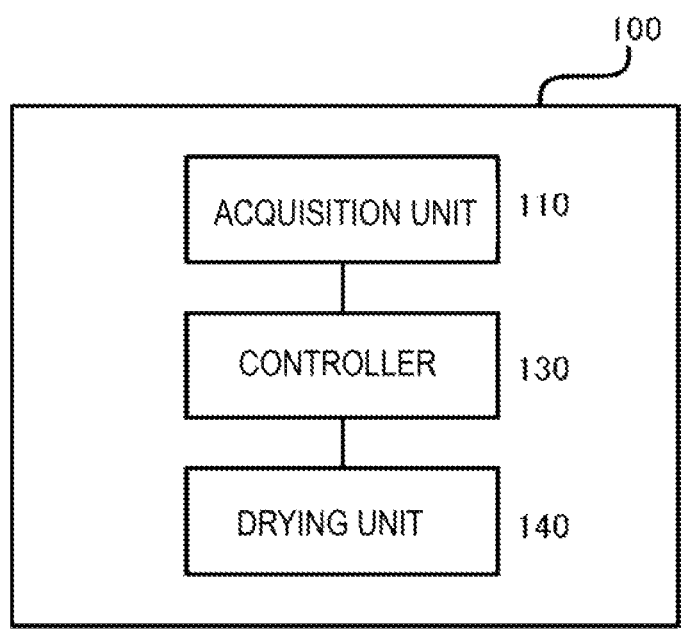
FIG. 2 is a block diagram illustrating a configuration of a recording apparatus according to an exemplary embodiment.

In addition, as shown in FIG. 2, the recording apparatus 100 may include an acquiring unit 110 that acquires ink information on ink used. The acquisition of the ink information may be manually performed by a user or a maintenance person or may be automatically put in. Then, in a case where the ink information matches with the aqueous ink according to the exemplary embodiment, the controller 130 may control such that the drying temperature Td by the drying unit 140 satisfies Th<Tg<Td. Here, Th represents a temperature of the ejection head and Tg represents a glass-transition temperature of the polymer particles contained in the ink.

It is needless to say that the exemplary embodiment described above is not construed to be limited only thereto, and is realized within a range in which the requirements of the invention is satisfied.

EXAMPLE

Hereinafter, the invention will be specifically described using Example; however, the invention is not limited to any of Examples.

Preparation of Black Ink K

Black Ink K1

Carbon black (Mogul L by Cabot Corporation): 5% by weight

Styrene-acrylic acid copolymer sodium neutralization product (Mw=30,000):2.5% by weight Acrylic emulsion (polymer particles and styrene-acrylic acid-sodium acrylic acid copolymer adjusted to have a particle diameter of 120 nm and a glass-transition temperature Tg of 45° C.:2% by weight Propylene glycol: 10% by weight Diethylene glycol:5% by weight Surfactant (Olfin E1010 by Nissin Chemical Industry Co., Ltd.):1.5% by weight Surfactant (Olfin E1004 by Nissin Chemical Industry Co., Ltd.):0.5% by weight ion exchanged water: remainder The above compositions are fixed and then the mixture is filtered using a filter having a hole diameter of 5 μm, thereby obtaining black ink K1.

Black Inks K2 to K6

The amount of composition of propylene glycol and diethylene glycol, or the amount of composition of acrylic emulsion is modified and a monomeric organization of the acrylic emulsion is modified from the preparation of the black ink K1, thereby obtaining black inks K2 to K6 having viscosity characteristics and Tg shown in Table 1.

Examples 1 to 3, Comparative Examples 1 to 3

Preparation of Recording Apparatus

A recording apparatus including a piezo head of 600 dpi (an amount of the maximum ink droplet of 11 pl), which ejects the black ink and a near-infrared heater, which dries the black ink ejected on the recording medium is prepared.

An ink cartridge of the recording apparatus is filled with the prepared black ink, and then the following evaluation is performed.

Evaluation of Latency

The evaluation of the following latency is performed by a recording apparatus in which a temperature of an ejection head (ejection surface) and a drying temperature by a near-infrared heater are set to temperatures shown in Table 1.

A printing pattern having a coverage of 30% per page is recorded on a recording medium "Next-IJ 70 (continuous paper by Nippon Paper Industries Co., Ltd.)" at a recording speed of 50 m/min (transporting speed of the recording medium) in a printing length of 4,000 m. Then, 5 pl of the black ink is ejected from the ejection head, and then a shift in a landing position is measured when the next ejection of the black ink is performed after ejection is stopped for 0.36 seconds after the previous ejection of the black ink. Note that the stopping time of the ink ejection is adjusted depending on a recording speed and a length (length of the recording medium in the transporting direction) of a non-ejection portion (region in which an image is not formed, that is, non-image portion).

Specifically, with a one-dot line recorded immediately after recording of a solid image as a reference, an extent, to which a distance of a one-dot line (one-dot line recorded after the stopping of 0.36 seconds) recorded immediately after the non-image portion of about 12 inches is spaced in the transporting direction of the recording medium after the recording of the beta image is shifted with respect to a length of the non-image portion corresponding to a period of stopping for 0.36 seconds, is measured and the measured value represents an amount of shift in the landing position. Evaluation criteria of the shift in the landing position are as follows.

—Evaluation Criteria—

G1(A): An amount of a shift in landing position is 22 μm or shorter.
G2(B): An amount of a shift in landing position is longer than 22 μm and 43 μm or shorter.
G3(D): An amount of a shift in landing position is longer than 43 μm.

Evaluation of Landing Irregularity

The evaluation of the following landing irregularity is performed by a recording apparatus in which a temperature of an ejection head (ejection surface) and a drying temperature by a near-infrared heater are set to temperatures shown in Table 1.

A printing pattern having a coverage of 30% per page is recorded on a recording medium "Next-1J 70 (continuous paper by Nippon Paper Industries Co., Ltd.)" at a recording speed of 50 m/min (transporting speed of the recording medium) in a printing length of 4,000 m. Then, a halftone chart having a coverage of 80% is immediately formed. The halftone chart is visually observed and the evaluation of the landing irregularity is performed. Evaluation criteria are as follows.

—Evaluation Criteria—

G1(A): No streaky irregularity appears.
G2(B): Streaky irregularity appears at less than five positions.
G3(C): Streaky irregularity appears at less than ten positions.
G4(D): Streak appears due to missing of nozzles.

Evaluation of Smudge

The evaluation of the following smudge (fixability of ink) is performed by a recording apparatus in which a temperature of an ejection head (ejection surface) and a drying temperature by a near-infrared heater are set to temperatures shown in Table 1.

The ejection head ejects 8 pl of black ink to the recording medium "OK topcoat+110 (produced by Oji Paper Co., Ltd.) at a recording speed of 50 m/min (transporting speed of the recording medium) and a patch of 100% beta is formed. The recording medium "Next-IJ 70 (continuous paper by Nippon Paper Industries Co., Ltd.)" is laid on the patch of the beta within five minutes after the forming and then the recording medium is pressed by a force of 20 N. Then, the recording medium "Next-IJ 70 (continuous paper by Nippon Paper Industries Co., Ltd.)" is peeled off and optical density of a portion, to which the patch of the beta is transferred, is measured. Note that the optical density (transfer OD value) is measured by X-rite 939. Evaluation criteria are as follows.

—Evaluation Criteria—

G1(A): The transfer OD value is 0.03 or less.
G2(B): The transfer OD value is greater than 0.03 and 0.60 or less.
G3(D): The transfer OD value is greater than 0.60.

Hereinafter, details of examples are shown in the list in Table 1.

Note that, in Table, a viscosity ratio (VX(X=30° C. to 80° C.)/Vi) indicates a viscosity ratio (VX/Vi) of a viscosity VX that is obtained when the aqueous ink is heated at X° C. for 30 minutes to an initial viscosity of the aqueous ink.

TABLE

| | Black ink No. | Polymer particles Tg (° C.) | Viscosity characteristics | | | | | | | Temperature of ejection head = 32° C. Drying temperature = 80° C. | | | Temperature of ejection head = 40° C. Drying temperature = 130° C. | | |
|---|---|---|---|---|---|---|---|---|---|---|---|---|---|---|---|
| | | | V30/Vi | V35/Vi | V40/Vi | V50/Vi | V65/Vi | V80/Vi | V65/V35 | Latency | Landing irregularity | Smudge | Latency | Landing irregularity | Smudge |
| Example 1 | K1 | 45 | 1.7 | 1.8 | 1.8 | 3.8 | 9.4 | 19.2 | 5.3 | G2(B) | G2(B) | G1(A) | G2(O) | G2(B) | G1(A) |
| Example 2 | K2 | 55 | 1.7 | 1.8 | 1.9 | 5.2 | 9.6 | 14.3 | 5.2 | G1(A) | G1(A) | G1(A) | G2(O) | G2(B) | G1(A) |
| Example 3 | K3 | 65 | 1.7 | 1.8 | 1.8 | 5.5 | 18.2 | 42.1 | 10.4 | G2(B) | G3(C) | G2(B) | G2(O) | G3(C) | G2(B) |
| Comparative Example 1 | K4 | 80 | 1.9 | 2.0 | 2.1 | 6.2 | 18.2 | 37.8 | 9.2 | G3(D) | G2(B) | G2(B) | G3(D) | G2(B) | G2(B) |
| Comparative Example 2 | K5 | 95 | 1.8 | 1.9 | 2.0 | 6.3 | 14.6 | 29.6 | 7.6 | G3(D) | G2(B) | G2(B) | G3(D) | G2(B) | G2(B) |
| Comparative Example 3 | K6 | — | 1.4 | 1.8 | 2.2 | 2.5 | 10.3 | 20.1 | 5.7 | G2(B) | G1(A) | G3(D) | G3(D) | G2(B) | G3(D) |

From the results described above, in the Examples, it is found that the evaluation of the latency is good, compared to the Comparative Examples.

In addition, in the Examples, it is found that the evaluations of the landing irregularity and the smudge (fixability of ink) are good.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording method comprising:
ejecting aqueous ink to a surface of a recording medium by an ejection head, the aqueous ink containing a colorant, polymer particles having a glass-transition temperature Tg of 35° C. to 65° C., and a solvent containing water and an aqueous organic solvent, the aqueous ink having a viscosity ratio (V35/Vi) that is lower than 2.0, V35 being a viscosity that is obtained when the aqueous ink is heated at 35° C. for 30 minutes and Vi being an initial viscosity of the aqueous ink obtained at a temperature of 23° C. without heating, the aqueous ink having a viscosity ratio (V65/Vi) that is 8.0 to 20.0, V65 being a viscosity that is obtained when the aqueous ink is heated at 65° C. for 30 minutes and Vi being the initial viscosity of the aqueous ink obtained at a temperature of 23° C. without heating; and
drying the aqueous ink ejected to the surface of the recording medium by the ejection head,
wherein a head temperature Th of the ejection head, the glass-transition temperature Tg of the polymer particles, and a drying temperature Td satisfy an expression: Th<Tg<Td.

2. The recording method according to claim 1,
wherein a viscosity ratio (V65/V35) of the viscosity V65 of the aqueous ink that is obtained when the aqueous ink is heated at 65° C. for 30 minutes to the viscosity V35 of the aqueous ink that is obtained when the aqueous ink is heated at 35° C. for 30 minutes is 5.2 to 10.4.

3. A recording system comprising:
an ejection unit having an ejection head that ejects aqueous ink to a surface of a recording medium, the aqueous ink containing a colorant, polymer particles having a glass-transition temperature Tg of 35° C. to 65° C., and a solvent containing water and an aqueous organic solvent, the aqueous ink having a viscosity ratio (V35/Vi) that is lower than 2.0, V35 being a viscosity of the aqueous ink that is obtained when the aqueous ink is heated at 35° C. for 30 minutes and Vi being an initial viscosity of the aqueous ink obtained at a temperature of 23° C. without heating, the aqueous ink having a viscosity ratio (V65/Vi) that is 8.0 to 20.0, V65 being a viscosity of the aqueous ink that is obtained when the aqueous ink is heated at 65° C. for 30 minutes and Vi being the initial viscosity of the aqueous ink obtained at a temperature of 23° C. without heating; and
a drying unit that dries the aqueous ink ejected to the surface of the recording medium,
wherein a head temperature Th of the ejection head, the glass-transition temperature Tg of the polymer particles, and a drying temperature Td of the drying unit satisfy an expression: Th<Tg<Td.

4. The recording system according to claim 3,
wherein a viscosity ratio (V65/V35) of the viscosity V65 of the aqueous ink that is obtained when the aqueous ink is heated at 65° C. for 30 minutes to the viscosity V35 of the aqueous ink that is obtained when the aqueous ink it heated at 35° C. for 30 minutes is 5.2 to 10.4.

5. A recording apparatus comprising:
an acquisition unit that acquires information regarding aqueous ink which is ejected to a surface of a recording medium by an ejection unit having an ejection head;
a drying unit that dries the aqueous ink ejected to the surface of the recording medium; and
a controller that controls, in a case where the information regarding the aqueous ink acquired by the acquisition unit indicates that the aqueous ink contains a colorant, polymer particles having a glass-transition temperature Tg of 35° C. to 65° C., and a solvent containing water and an aqueous organic solvent, that a viscosity ratio (V35/Vi) is lower than 2.0, V35 being a viscosity of the aqueous ink that is obtained when the aqueous ink is heated at 35° C. for 30 minutes and Vi being an initial viscosity of the aqueous ink obtained at a temperature of 23° C. without heating, and that a viscosity ratio (V65/Vi) is 8.0 to 20.0, V65 being a viscosity of the aqueous ink that is obtained when the aqueous ink is heated at 65° C. for 30 minutes and Vi being the initial viscosity of the aqueous ink obtained at a temperature of 23° C. without heating, the drying unit such that a head temperature Th of the ejection head, the glass-transition temperature Tg of the polymer particles, and a drying temperature Td of the drying unit satisfy an expression: Th<Tg<Td.

6. The recording apparatus according to claim 5,
wherein a viscosity ratio (V65/V35) of the viscosity V65 of the aqueous ink that is obtained when the aqueous ink is heated at 65° C. for 30 minutes to the viscosity V35 of the aqueous ink that is obtained when the aqueous ink is heated at 35° C. for 30 minutes is 5.2 to 10.4.

* * * * *